United States Patent [19]
Malen et al.

[11] 3,835,141
[45] Sept. 10, 1974

[54] QUINALYTHIOHYDROXIMIC ACIDS AND THEIR DERIVATIVES

[75] Inventors: Charles Malen, Fresnes; Bernard Danree, St. Germain en Laye; Xavier Pascaud, Paris, all of France

[73] Assignee: Science Union Et Cie, Societe Francaise De Recherche Medicale, Suresnes, France

[22] Filed: Mar. 30, 1972

[21] Appl. No.: 239,778

[30] Foreign Application Priority Data
Apr. 15, 1971  Great Britain .................... 9502/71

[52] U.S. Cl. .... 260/283 S, 260/294.8 R, 260/250 R, 260/287 R, 260/288 R, 260/242, 260/270 R, 260/296 M, 424/258, 424/245, 424/250, 424/263
[51] Int. Cl. ...................... C07d 35/28, C07c 33/38
[58] Field of Search ................................. 260/283 S

[56] References Cited
OTHER PUBLICATIONS
König et al., "Pyridincarbonsäuren", 1954, pg. 825.
Chem. Abstracts, Vol. 58, 8620g.

*Primary Examiner*—Donald G. Daus
*Assistant Examiner*—D. Wheeler
*Attorney, Agent, or Firm*—Gordon W. Hueschen; John T. Reynolds

[57]  ABSTRACT

Thiohydroximic acid compounds of the formula:

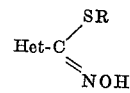

wherein Het is pyridyl, pyrazinyl, quinolyl, isoquinolyl, or these radicals substituted by halogen, lower alkyl or lower alkoxy, and R is hydrogen, lower alkyl, aryl or aryl-lower-alkyl, provided that R never by hydrogen when Het is 4-pyridyl.

These compounds possess gastric antisecretory, antiulcerous, gastrointestinal motility increasing, central nervous system stimulating and vasodilatory properties.

11 Claims, No Drawings

QUINALYTHIOHYDROXIMIC ACIDS AND THEIR DERIVATIVES

The present invention provides compounds of the general formula I:

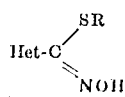  I addition salts and metal complexes thereof, wherein:

Het is selected from the group consisting of pyridyl, pyrazinyl, quinolyl and isoquinolyl radicals and all of these radicals substituted by substituents selected from the group consisting of halogen atoms, and alkyl and alkoxy radicals each having from 1 to 5 carbon atoms inclusive; and R is selected from the group consisting of a hydrogen atom, alkyl, aryl and aralkyl radicals wherein the alkyl moieties have from one to five carbon atoms inclusive, provided that R never be a hydrogen atom when Het is a 4-pyridyl radical.

The compounds of the general formula I are amphoteric compounds and may be converted into addition salts with mineral or organic acids, or with mineral bases. As acids suitable for the formation of these salts, there may be mentioned for example, in the mineral series, hydrochloric, hydrobromic, sulfuric, and phosphoric acids, and in the organic series, acetic, propionic, maleic, fumaric, tartaric, citric, oxalic, benzoic, methanesulfonic, methanedisulfonic and isethionic acids. As mineral bases there may be mentioned, for example, alkali and alkaline earth metal hydroxides.

Furthermore, the compounds of the general formula I may be converted in metal complexes when treated with a salt of a transition metal such, for example, as copper, iron, nickel and cobalt, in an aqueous solution, by controlling the pH of the reaction mixture.

The compounds of the general formula I are new and may be prepared according to a process wherein a carbaldehyde oxime of the general formula II:

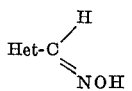  II is saturated with chlorine, and the so-obtained carbaldehyde chloroxime of the general formula III:

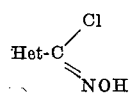  III is reacted with a sodium sulfide of the general formula IV:

R — S — Na    IV wherein Het and R have the meanings given above.

Most of the carbaldehyde oximes of the general formula II are known. When they are unknown, they may be prepared by reacting the corresponding carbaldehydes with hydroxylamine, according to known methods.

The compounds of the general formula I may also be prepared by isolating the nitrile oxide of the general formula V:

$$Het - C \equiv N \longrightarrow O \qquad V$$

which is an intermediate in the condensation of derivatives III and IV in the above given process, then reacting this compound V with H$_2$S or R-SH, according to the method described by T. Bacchetti, A. Alemagna, Rend. Acad. Lincei 91, 30–38 (1957), Het and R having in these formulae the same meanings as in formula I.

The compounds of the general formula I wherein R is lower alkyl or aryl-lower-alkyl may also be prepared by reacting a sodium thiocarbohydroximate of the general formula:

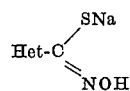

wherein Het has the meanings given above, with an alkyl or aralkyl halide of the general formula R-X wherein X represents a halogen atom and R represents a lower alkyl radical or an arylloweralkyl radical.

The following Examples illustrate the invention, the melting points being determined on a Kofler block.

EXAMPLE 1

6-quinolinethiocarbohydroximic acid

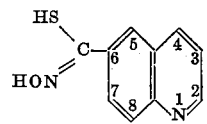

A suspension of 28.4 g (0.165 mole) of 6-quinolinecarbaldehyde oxime in 220 ml of methanol was saturated with chlorine at a temperature within the range of from 5° to 10° C. The oxime dissolved gradually and the corresponding chloroxime hydrochloride precipitated out.

The precipitate was suction-filtered off, washed with methanol and dried. These were obtained 36.4 g of crude 6-quinolinecarbaldehyde chloroxime hydrochloride (yield: 90 %) melting instantaneously at 250–260° C with decompostion.

A sodium hydrosulfide solution was cold-prepared starting from 59.5 g (1.49 mole) of sodium hydroxide, 51 g (1.49 mole) of hydrogen sulfide and 600 ml of water. The sodium hydrosulfide solution obtained was diluted with 400 ml of ethanol and then maintained at a temperature of 10°C while adding a solution of 36.2 g (0.149 mole) of crude 6-quinolinecarbaldehyde chloroxime hydrochloride in 600 ml of water over an period of an hour. On the completion of the addition, the reaction mixture was kept at a temperature of 10° C for half an hour and then the ethanol was evaporated under vacuum at 45° C maximum. The aqueous phase was extracted with ether, then acidified up to pH 4.5 with a 10 N hydrochloric acid solution. The precipitated thiocarbohydroximic acid was suction-filtered off, washed with water and dried.

There were obtained 19.6 g of crude 6-quinolinethiocarbohydroximic acid, in form of beige crystals melting at 170°–172° with decomposition. After purification by dissolution in a 10 % sodium carbonate solution and precipitation at pH 4.5, there were obtained 17.3 g of pure 6-quinolinethiocarbohydroximic acid.

EXAMPLES 2–11

The following compounds were prepared according to the method described in Example 1. 2. 8-quinolinethiocarbohydroximic acid, M.P. 116°–117° C with decomposition, starting from 8-quinolinecarbaldehyde oxime, yield 69 %. 3. 2-pyridinethiocarbohydroximic acid, M.P. 170°–173° C, starting from 2-pyridinecarbaldehyde chloroxime hydrochloride, yield 71 %. 4. 3-pyridinethiocarbohydroximic acid, M.P. 142°–144° C, starting from 3-pyridinecarbaldehyde chloroxime hydrochloride, yield 51 %. 5. 2-quinolinethiocarbohydroximic acid, M.P. 148°–150° C, starting from 2-quinolinecarbaldehyde oxime. 6. 3-quinolinethiocarbohydroximic acid, M.P. 165°–167° C starting from 3-quinolinecarbaldehyde oxime. 7. 4-quinolinethiocarbohydroximic acid monohydrate, M.P. 136°–138° C, starting from 4-quinolinecarbaldehyde oxime. 8. 7-quinolinethiocarbohydroximic acid, M.P. 144°–146° C, starting from 7-quinolinecarbaldehyde oxime. 9. 1-isoquinolinethiocarbohydroximic acid, M.P. 168°–170° C, starting from 1-isoquinolinecarbaldehyde oxime. 10. 3-isoquinolinethiocarbohydroximic acid, M.P. 178°–180° C, starting from 3-isoquinolinecarbaldehyde oxime. 11. 4-isoquinolinethiocarbohydroximic acid, M.P. 168°–170° C, starting from 4-isoquinolinecarbaldehyde oxime.

EXAMPLE 12 methyl 6-quinolinethiocarbohydroximate

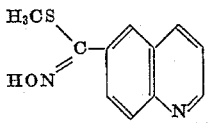

A methanolic solution of sodium methyl sulfide was prepared starting from 5.8 g (0.25 mole) of sodium, 12 g (0.25 mole) of methyl hydrosulfide and 100 ml of methanol. 6.07 g (0.025 mole) of 6-quinolinecarbaldehyde chloroxime hydrochloride were added to this solution at a temperature of less than 40° C. On the completion of the addition, the reaction mixture was heated under reflux for one and a half hours. After cooling, the precipitate of sodium chloride was suction-filtered off and methanol was evaporated under vacuum. The residue was taken up with water and the solution was brought to pH 8 by adding a 6 N hydrochloric acid solution. The so-precipitated ester was suction-filtered off, washed until neutral and then dried. There were obtained 5 g of crude ester melting at 204°–206° C, while after recrystallisation from ethanol gave 4 g of methyl 6-quinolinethiocarbohydroximate, melting at 215°–216° C.

EXAMPLE 13

S-benzyl-4-quinolinethiocarbohydroximate, was prepared according to the method described in Example 12, starting from sodium benzyl sulfide and 4-quinolinecarbaldehyde chloroxime hydrochloride.

EXAMPLE 14 ferric complex of 6-quinolinethiocarbohydroximic acid 3.30 ml of a molar aqueous solution of ferric chloride were added to 2.62 g (0.01 mole) of sodium 6-quinolinethiocarbohydroximate dihydrate in solution in 30 ml of water.

The pH of the reaction mixture was maintained to 7 by adding a normal sodium hydroxide solution. The so-obtained black precipitate was washed with water, then ethanol and ether, then dried under vacuum. There were obtained 2.15 g of ferric complex of 6-quinolinethiocarbohydroximic acid (yield 97 %), black powder soluble in methylcellosolve, in dimethylformamide and in pyridine, the visible U.V. spectrum of which shows a maximum of absorbance for the wavelenght of 6,000, 4,800 and 2,400 A.

EXAMPLES 15–16

The following compounds were prepared according to the method described in Example 14:

15. cupric complex of 6-quinolinethiocarbohydroximic acid. Starting from 2.62 g (0.01 mole) of sodium 6-quinolinethiocarbohydroximate dihydrate, and a molar aqueous solution of cupric chloride, there were obtained 2.7 g of cupric complex of 6-quinolinethiocarbohydroximic acid, (yield 89 %), brown powder soluble in dimethylformamide, and in pyridine.

16. Nickelo complex of 6-quinolinethiocarbohydroximic acid. Starting from 2.62 g (0.01 mole) of sodium 6-quinolinethiocarbohydroximate dihydrate and a molar aqueous solution of nickelo chloride, there were obtained 1.9 g of nickelo complex of 6-quinolinethiocarbohydroximic acid (yield: 82 %), brown powder soluble in pyridine and in dimethylformamide, the visible U.V. spectrum of which shows a maximum of absorbance for the wavelenght of 4,400, 3,400, 2,740, and 2,430 A.

The derivatives of general formula I and physiologically tolerable salts and metal complexes thereof possess valuable pharmacological and therapeutic properties, especially gastric antisecretory, antiulcerous, gastrointestinal motility increasing, central nervous system stimulating and vasodilatory properties and they are therefore useful as medicines.

Their toxicity is weak and the $LD_{50}$ in mice varies between 300 and > 1,000 mg/kg by oral route.

The activity of the new compounds on the gastric secretion was demonstrated by the method of Shay H. et al. (Gastroent. 5, 43, 1945). A 50 percent decrease of the volume of the free gastric acid was observed with 2.35 to 60 mg/kg of the compounds administered by intraduodenal route. The anti-secretory activity was also found on the Pavlov's dog.

The compounds of the invention exhibit an important protecting activity against the restraint ulcer. 5 to 100 mg/kg of them administered by oral route given 20 to 75 percent of protection when compared with untreated control animals. They possess also a protecting activity against the ulcers provoked by acetyl salicylic acid and by phenylbutazone.

An increase of the gastrointestinal motility was observed by 10 to 60 mg/kg of the compounds of the invention; a stimulating activity on the smooth muscle of the gastrointestinal apparatus and the uterus was observed. They also have a peripheral vasodilating activity, and stimulating activity on the central nervous system.

On the other hand, they have no inhibiting activity of acetylcholine.

The low toxicity and the above described pharmacological properties enable the use of the new compounds in therapy and especially in the treatment of gastroduodenal ulcers and gastric hypersecretion.

The present invention also provides pharmaceutical compositions comprising a compound of general formula I or a physiologically tolerable salt or a metal complex thereof in admixture or conjunction with a pharmaceutically suitable carrier.

These suitable pharmaceutical carriers may be, for example, distilled water, starch, talc, glucose, lactose or cocoa butter in order to obtain the suitable pharmaceutical forms such, for example, as tablets, dragees, capsules, suppositories or solutions.

The compositions may be administered by oral, rectal or parenteral route, at the dose of 50 to 500 mg, preferably 100 to 300 mg, in active ingredient, 1 to 5 times a day.

We claim:

1. An arylthiohydroximic acid selected from the group consisting of a quinolylthiohydroximic acid of the formula

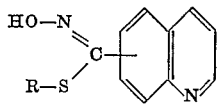

wherein R is a member selected from the group consisting of hydrogen, lower alkyl having from 1 to 5 carbon atoms, phenyl, and phenyl—$C_1$ to $C_5$-alkyl, an physiologically tolerable acid addition salt thereof, and wherein the floating radical

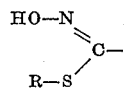

is located in the 2, 3, 4, 5, 6, 7 or 8 position of the quinoline ring.

2. A compound of claim 1 which is 6-quinolinethiocarbohydroximic acid.

3. A compound of claim 1 which is 8-quinolinethiocarbohydroximic acid.

4. A compound of claim 1 which is 1-isoquinolinethiocarbohydroximic acid.

5. A compound as defined in claim 1 wherein the compound is 2-quinolinethiocarbohydroximic acid.

6. A compound as defined in claim 1 wherein the compound is 3-quinolinethiocarbohydroximic acid.

7. A compound as defined in claim 1 wherein the compound is 4-quinolinethiocarbohydroximic acid.

8. A compound as defined in claim 1 wherein the compound is 7-quinolinethiocarbohydroximic acid.

9. A compound as defined in claim 1 wherein the compound is methyl 6-quinolinethiocarbohydroximate.

10. A compound as defined in claim 1 wherein the compound is benzyl 4-quinolinethiocarbohydroximate.

11. A compound selected from the group consisting of 1-isoquinolinethiocarbohydroximic acid, 3-isoquinolinethiocarbohydroximic acid and 4-isoquinolinethiocarbohydroximic acid.

* * * * *